United States Patent
Wu et al.

(10) Patent No.: US 12,213,147 B2
(45) Date of Patent: Jan. 28, 2025

(54) METHODS FOR DFI TRANSMISSION IN NR-U

(71) Applicant: GUANGDONG OPPO MOBILE TELECOMMUNICATIONS CORP., LTD., Guangdong (CN)

(72) Inventors: Zuomin Wu, Guangdong (CN); Hao Lin, Neuilly-sur-Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 371 days.

(21) Appl. No.: 17/663,179

(22) Filed: May 12, 2022

(65) Prior Publication Data

US 2022/0272741 A1 Aug. 25, 2022

Related U.S. Application Data

(63) Continuation of application No. PCT/CN2020/130057, filed on Nov. 19, 2020.
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04W 16/14* (2013.01); *H04W 72/1268* (2013.01)

(58) Field of Classification Search
CPC . H04W 72/23; H04W 16/14; H04W 72/1268; H04L 1/1812; H04L 1/1864;
(Continued)

(56) References Cited

U.S. PATENT DOCUMENTS

2020/0100286 A1* 3/2020 Xu .......................... H04L 1/187
2021/0400714 A1* 12/2021 Huang .................. H04W 72/23
(Continued)

FOREIGN PATENT DOCUMENTS

| CN | 109391372 A | 2/2019 |
| CN | 109392062 A | 2/2019 |

(Continued)

OTHER PUBLICATIONS

Extended European Search Report for European Application No. 20889853.6 issued Nov. 4, 2022. 8 pages.
(Continued)

*Primary Examiner* — Tejis Daya
(74) *Attorney, Agent, or Firm* — PERKINS COIE LLP

(57) ABSTRACT

A method for downlink feedback information transmission in a shared spectrum is described, the method comprising: transmitting by a network node to a user equipment at least one downlink control information, said downlink control information carrying a downlink feedback information, wherein the downlink feedback information comprises a Hybrid Automatic Repeat Request Acknowledgement, HARQ-ACK, feedback information for a transmission from the user equipment to the network node.

19 Claims, 4 Drawing Sheets

Related U.S. Application Data

(60) Provisional application No. 62/937,765, filed on Nov. 19, 2019.

(51) Int. Cl.
  *H04W 16/14* (2009.01)
  *H04W 72/1268* (2023.01)

(58) Field of Classification Search
  CPC ... H04L 1/1819; H04L 1/1822; H04L 1/1671; H04L 5/0055; H04L 1/1607
  See application file for complete search history.

(56) References Cited

U.S. PATENT DOCUMENTS

| | | | |
|---|---|---|---|
| 2022/0046667 A1* | 2/2022 | Sun | H04L 1/1887 |
| 2022/0078728 A1* | 3/2022 | Yi | H04W 48/16 |
| 2022/0116953 A1* | 4/2022 | Kim | H04L 1/1861 |
| 2023/0143581 A1* | 5/2023 | Myung | H04W 72/1268 370/329 |
| 2023/0269772 A1* | 8/2023 | Chen | H04W 74/0808 370/329 |
| 2024/0106565 A1* | 3/2024 | Liu | H04L 1/0057 |

FOREIGN PATENT DOCUMENTS

| | | |
|---|---|---|
| CN | 109451798 A | 3/2019 |
| WO | 2016070790 A1 | 5/2016 |
| WO | 2018201504 A1 | 11/2018 |
| WO | 2019029665 A1 | 2/2019 |
| WO | 2019095237 A1 | 5/2019 |

OTHER PUBLICATIONS

MediaTek Inc. "Remaining issues on NR-U configured grant" R1-1912091; 3GPP TSG RAN WG1 #99; Reno, USA; Nov. 18-22, 2019. 6 pages.

Qualcomm Incorporated "Enhancement to configured grants in NR unlicensed" R1-1912941; 3GPP TSG RAN WG1 Meeting #99; Reno, USA; Nov. 18-22, 2019. 12 pages.

International Search Report issued Feb. 19, 2021 of PCT /CN2020/ 130057 (2 pages).

Examiners call and proposed amendments of the European application No. 20889853.6, issued on Aug. 7, 2023. 4 pages.

First Office Action of the Chinese application No. 202210861272.5, issued on May 31, 2024. 18 pages with English translation.

Second Office Action of the Chinese application No. 202210861272. 5, issued on Jul. 31, 2024. 15 pages with English translation.

Ericsson, "Configured grant enhancement", R1-1912712, 3GPP TSG-RAN WG1 Meeting #99, Reno, USA, Nov. 18-22, 2019. 7 pages.

* cited by examiner

METHODS FOR DFI TRANSMISSION IN NR-U

CROSS-REFERENCE TO RELATED APPLICATIONS

The present application is a continuation application of International PCT Application No. PCT/CN2020/130057, filed on Nov. 19, 2020, which claims priority of U.S. provisional patent application No. 62/937,765, filed on Nov. 19, 2019. The above-identified applications are hereby incorporated by reference in their entireties.

TECHNICAL FIELD

The present invention relates to transmission in a shared spectrum. More specifically, the present invention relates to methods and apparatus for transmission in the shared spectrum. In particular, the present invention relates to methods and apparatus for transmitting downlink feedback information (DFI) in the shared spectrum.

BACKGROUND

The radio spectrum for radio communication is generally assigned to different operators through administrative licensing. For this, an operator of a radio communication network applies for a proprietary spectrum authorization, such as an exclusive license, from the government of a particular country or a region. The proprietary spectrum authorization enables the operator of the communication network to obtain a licence over a particular frequency range of the radio spectrum. Such licensing of the radio spectrum is beneficial since it offers for interference protection of the signals exchanged in the operator's communication network using the licensed frequency range of the radio spectrum.

The wide use of smartphones, tablets and other personal portable devices for wireless communication has resulted in growing demand on traffic in the licensed spectrum. The LongTerm Evolution (LTE) technology, originally deployed and designed for licensed spectrum, is becoming unable to satisfy this growing demand due to lack of available resources in the licensed spectrum. Therefore, resources in an unlicensed spectrum are seen as candidates for satisfying the growing demand on traffic. Communication in the unlicensed spectrum is expected to play an important role not only in the LTE technology but also in its evolution in the new radio technology also called 5G or NR. In particular, communication in the NR unlicensed spectrum (NR-U) is expected to enable a significant increase of the available spectrum for radio communication.

In difference to the licensed spectrum, the unlicensed spectrum is a shared spectrum. The communication equipment in different radio communication networks for wireless communication that may be operated by different operators can use the shared spectrum as long as it meets the regulatory requirements set by the country or region on the shared spectrum.

In order to allow various communication systems that use shared spectrum for wireless communication to coexist friendly in the spectrum, some countries or regions specify regulatory requirements that must be met to use the shared spectrum. One requirement may relate to the channel access procedure to be performed by a communication device before transmitting a signal on a channel in the shared spectrum. For example, the communication device follows the principle of "Listen Before Talk (LBT)" to perform channel access procedure. More specifically, the communication device performs channel sensing before transmitting the signal on the channel. Only when the LBT outcome shows that the channel is idle, the communication device such as a user equipment can perform signal transmission; otherwise, the communication device cannot perform signal transmission. In order to ensure fairness, once a communication device successfully occupies the channel, the transmission duration of the communication device cannot exceed the Maximum Channel Occupancy Time (MCOT) which is the maximum continuous transmission time after channel sensing.

Performing channel access procedure through LBT has been identified as leading to access delay of the uplink transmission due to the double listen-before-talk (LBT) requirements at both the network node when sending the uplink grant, and at the user equipment before uplink transmission on the Physical Uplink Shared Channel (PUSCH). Therefore, it has been proposed to use configured uplink transmission procedure in the shared spectrum in which, the user equipment may transmit PUSCH on a pre-configured uplink resource autonomously, which can avoid two times of LBT (as elaborated above one time for uplink grant transmission at the network node side and second time for PUSCH transmission at the user equipment side). Therefore, the access delay of uplink transmission in this case can be reduced.

However, the transmission reliability of configured uplink grant in unlicensed carrier cannot be guaranteed since this carrier may be shared by multiple intra-systems and/or inter-systems. Therefore, unlike configured grant transmission in licensed carrier, the base station, such as the gNodeB (gNB) in the NR technology, should explicitly indicate to the user equipment whether the configured grant transmission is successfully received or not. For example, the gNB should transmit the corresponding Hybrid Automatic Repeat Request Acknowledgement (HARQ-ACK) feedbacks to the UE. The corresponding HARQ-ACK feedbacks which are also called a downlink feedback information (DFI) can be carried in Downlink Control Information (DCI).

Downlink feedback information (DFI) can be used to reflect the reception results of uplink transmission at the gNodeB side.

One example is, for transport block (TB) based HARQ-ACK feedback, if the gNodeB correctly detects the transport block, the gNodeB generates an ACK value for the transport block; otherwise, the gNodeB generates a NACK value for the transport block.

Another example is, for Code Block Group (CBG) based HARQ-ACK feedback, the gNodeB generates an ACK for the HARQ-ACK information bit of a CBG if the gNodeB correctly received all code blocks of the CBG and generates a NACK for the HARQ-ACK information bit of a CBG if the gNodeB incorrectly received at least one code block of the CBG. If gNodeB correctly detects each of the N CBGs and does not correctly detect the transport block for the N CBGs, the gNodeB generates a NACK value for each of the N CBGs.

Although the introduction of the downlink feedback information (DFI) is due to configured uplink grant transmission, the downlink feedback information (DFI) can contain HARQ-ACK feedbacks for all the uplink HARQ process numbers (or HARQ process IDs), which includes both configured uplink grant transmission and scheduled uplink transmission. The HARQ-ACK codebook in downlink feedback information (DFI) is determined according to the arranged HARQ process numbers, and the valid HARQ- ACK information within the HARQ-ACK codebook can be used for contention window size adjustment in unlicensed carrier.

For uplink transmission in the NR Unlicensed (NR-U) spectrum using configured uplink grant transmission, both configured uplink grant Type 1 and configured uplink grant Type 2 configurations are supported. However, how to design downlink feedback (DFI) transmission under each configuration has not been discussed.

SUMMARY

The mentioned problems and objects are met by the subject-matter of the independent claims. Advantageous embodiments are defined in the dependent claims.

According to an embodiment of the present invention there is provided a method for downlink feedback information transmission in a shared spectrum, the method comprising: transmitting by a network node to a user equipment at least one downlink control information, said downlink control information carrying a downlink feedback information, wherein the downlink feedback information comprises a Hybrid Automatic Repeat Request Acknowledgement, HARQ-ACK, feedback information for a transmission from the user equipment to the network node.

BRIEF DESCRIPTION OF THE DRAWINGS

Embodiments of the present invention which are presented for better understanding the inventive concept of the present invention, but which are not to be seen as limiting the present invention, will now be described with reference to the figures in which.

DETAILED DESCRIPTION

The present invention provides a method for downlink feedback information (DFI) transmission in NR-U, which can be used under the configuration of configured uplink grant Type 1 or configured uplink grant Type 2.

Figure 1:
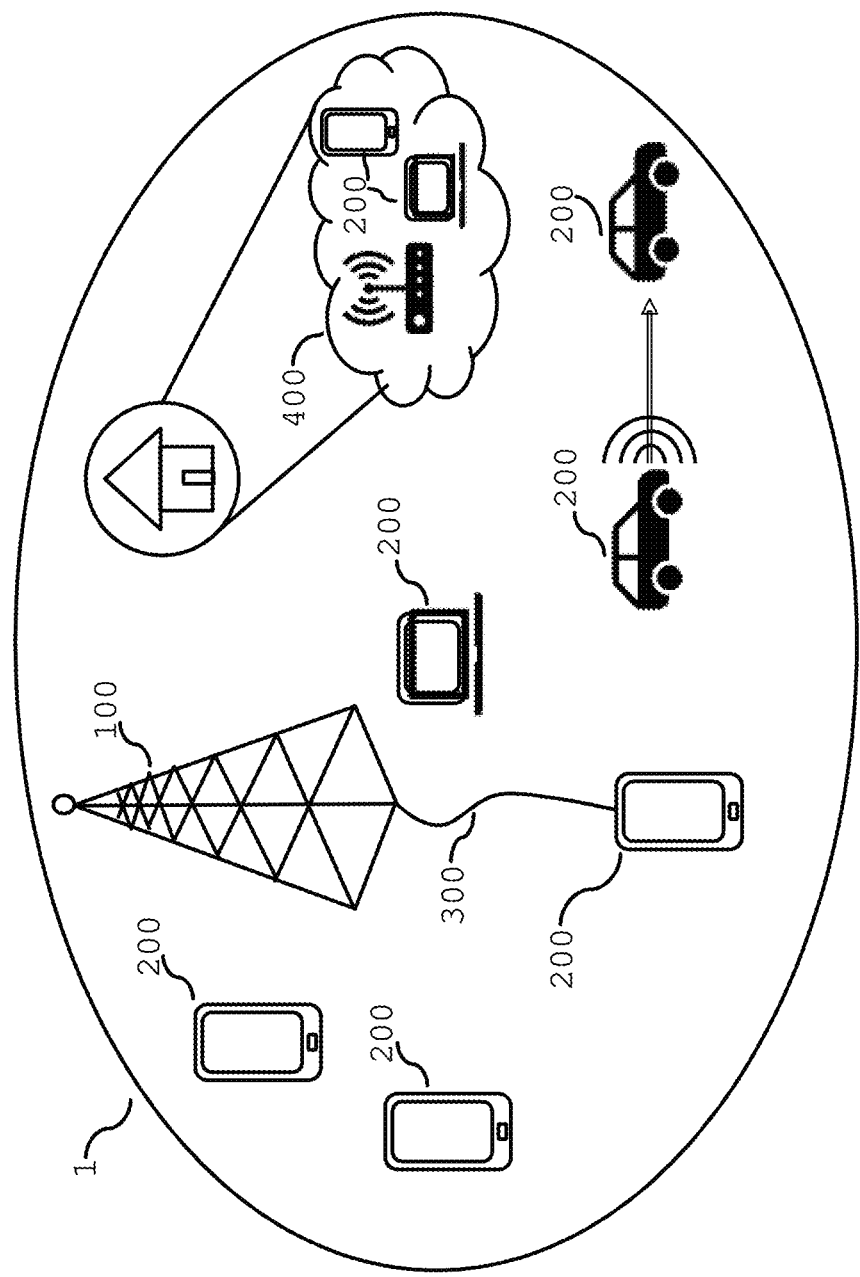
FIG. 1 shows schematically the network architecture according to an embodiment of the present invention.

FIG. 1 shows schematically the architecture of the communication network 1 according to one embodiment of the present invention.

The communication network 1 may support any kind of cellular wireless communication technology. The communication network 1 comprises at least one network node 100 and at least one user equipment (UE) 200. The wireless communication technology may be the LTE technology but may also be the NR (5G) technology.

The at least one network node 100 may be any kind of network device or radio node of a wireless communication network, such as base station (BS), node B, evolved node B (eNodeB or eNB), NR node B (gNodeB or gNB), relay node, micro, nano, pico or femto node deployed in other different wireless communication technologies.

Further to the at least one network node 100, the communication network 1 may comprise for example at least one access point 400. The access point 400 may be deployed, for example, in a building to form a small cell, called a femtocell or a picocell. Such small cell may use Wi-Fi or other short-range communication technology.

The at least one network node 100 and the at least one user equipment 200 according to the embodiment of the present invention may in general be considered as a device or a node adapted for wireless and/or radio (and/or microwave) frequency communication, and/or communication utilizing an air interface, for example according to a communication standard. The communication standard may be, but is not limited to, the LTE communication standard or the NR communication standard.

The at least one user equipment 200 may represent an end device for communication utilizing the wireless communication network, and/or be implemented as a user equipment according to the LTE, or NR or the like communication standard. Examples of user equipment may comprise a phone such as a smartphone, a personal communication device, a mobile phone or terminal, a computer, a laptop, a modem, a sensor or machine with radio capability adapted for the air interface and optionally adapted for machine-type-communication (MTC), in particular for machine-to-machine communication (M2M), device-to-device communication (D2D), or a vehicle adapted for wireless communication. The user equipment may be mobile or stationary, for example part of the roadway infrastructure.

The at least one network node 100 is able to send to the at least one user equipment 200 any kind of data and/or information such as control information, normally called downlink data (DL) and/or downlink (DL) information via the communication link 300. The downlink data (DL) and/or downlink (DL) information may be transmitted via different channels such as for example the Physical Downlink Control Channel (PDCCH) or the Physical Downlink Shared Channel (PDSCH). The at least one user equipment 200 is able to send to the network node 100 any kind of data and/or information such as control information, normally called uplink data (UL) and/or uplink (UL) information via the communication link 300. The uplink data (UL) and/or uplink (UL) information may be sent on different channels, such as for example the Physical Uplink Control Channel (PUCCH) or the physical Uplink Shared Channel (PUSCH). The communication link 300 is the air interface under the LTE or NR or the like wireless communication technology. FIG. 1 shows only the communication link 300 between the network node 100 and one user equipment 200. Nevertheless, it is understood that the same applies to the other user equipment 200 nodes shown in FIG. 1. In other words, communication link 300 may also exist between the network node 100 and the other user equipment 200 nodes.

Furthermore, some user equipment 200 nodes may be able to directly exchange data between each other using sidelink communication via the sidelink communication link. The sidelink communication link may be Bluetooth, Wi-Fi or the like. The sidelink communication link is a communication link that supports direct communication between two user equipment nodes without the need for the communication to be routed through the network node 100. With the sidelink communication two user equipment nodes may be operated in the D2D mode or MTC mode or the like. The sidelink communication link may involve several physical channels, such as but not limited to the Physical Sidelink Shared Channel (PSSCH) and/or the Physical Sidelink Control Channel (PSCCH). FIG. 1 shows for example two vehicles as user equipment adapted for sidelink communication.

In the following it will be assumed that the wireless communication technology according to the embodiment of the present invention is the NR technology. In accordance therewith, it will be assumed that the at least one network node 100 is an NR node B (gNodeB or gNB) in the above-mentioned NR technology. However, this is by no means to be seen as limiting to the present invention.

In the communication network 1 the network node 100 and the user equipment 200 nodes communicate in the licensed spectrum but may also communicate in the unlicensed spectrum, also called shared spectrum.

In the following, it will be assumed that the network node 100 (gNodeB, gNB) and at least one user equipment 200 (here below called user equipment 200) communicate in the shared spectrum.

Figure 2:
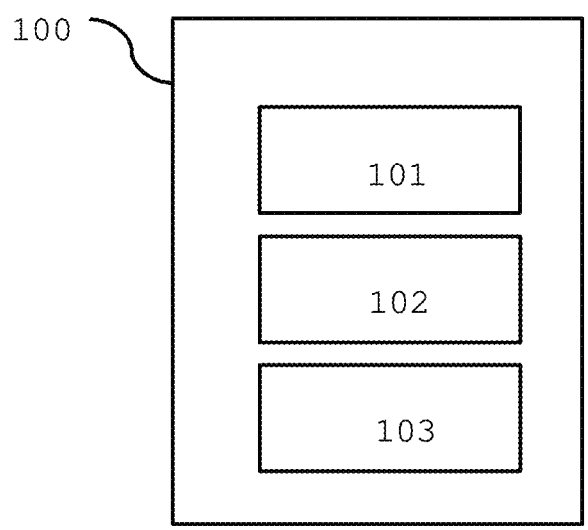
FIG. 2 shows schematically the functional components of a network node according to the embodiment of the present invention.

FIG. 2 shows schematically the network node 100. FIG. 2 shows an exemplary configuration for the network node 100. In particular, FIG. 2 shows an exemplary configuration of the functional components of the network node 100. The network node 100 may comprise a processor 101, a memory 102 and a radio circuitry 103. The processor 101 may be a processing circuitry (which may also be referred to as control circuitry) which may comprise a controller connected to the memory 102. Any module of the network node 100, e.g. a communication module or determining module, may be implemented in and/or executable by, the processing circuitry 101, in particular as module in the controller. The network node 100 comprises further a radio circuitry 103 providing receiving and transmitting or transceiving functionality, e.g. one or more transmitters and/or receivers and/or transceivers, wherein the radio circuitry is connected or connectable to the processing circuitry 101. An antenna circuitry (not shown) of the network node 100 may be connected or connectable to the radio circuitry 103 to collect or send and/or amplify signals. The network node 100 may be adapted to carry out any of the methods for operating the network node 100 disclosed herein; in particular, it may comprise corresponding circuitry, e.g. processing circuitry, and/or modules.

Figure 3:
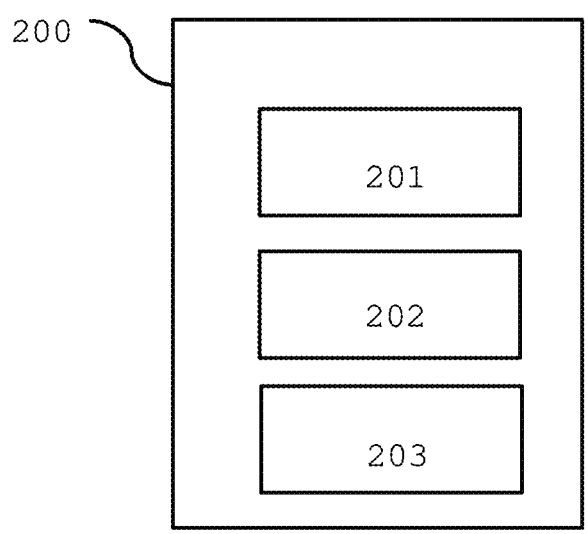
FIG. 3 shows schematically the functional components of a user equipment according to the embodiment of the present invention.

FIG. 3 shows schematically the user equipment 200. FIG. 3 shows an exemplary configuration for the user equipment 200. In particular, FIG. 3 shows an exemplary configuration of the functional components of the user equipment 200.

The user equipment 200 may comprise a processor 201 and a memory 202. The processor 201 may be a processing circuitry (which may also be referred to as control circuitry) which may comprise a controller connected to the memory 202. Any module of the user equipment, e.g. a communication module or determining module, may be implemented in and/or executable by, the processing circuitry 201, in particular as module in the controller. The user equipment may further comprise radio circuitry 203 providing receiving and transmitting or transceiving functionality, e.g. one or more transmitters and/or receivers and/or transceivers, wherein the radio circuitry is connected or connectable to the processing circuitry 201. An antenna circuitry (not shown) of the user equipment may be connected or connectable to the radio circuitry to collect or send and/or amplify signals. The user equipment may be adapted to carry out any of the methods for operating the user equipment disclosed herein; in particular, it may comprise corresponding circuitry, e.g. processing circuitry, and/or modules.

According to the embodiment of the present invention a computer program product comprising instructions adapted for causing processing and/or control circuitry to carry out and/or control any method described herein, in particular when executed on the processing and/or control circuitry is also considered. Also, a carrier medium arrangement carrying and/or storing a computer program product as described herein is also considered.

A carrier medium arrangement may comprise one or more carrier media. Generally, a carrier medium may be accessible and/or readable and/or receivable by processing or control circuitry. Storing data and/or a computer program product and/or code may be seen as part of carrying data and/or a program product and/or code. A carrier medium generally may comprise a guiding or transporting medium and/or a storage medium. A guiding or transporting medium may be adapted to carry and/or store signals, in particular electromagnetic signals and/or electric signals and/or magnetic signals and/or optical signals. A carrier medium, in particular a guiding or transporting medium, may be adapted to guide such signals to carry them. A carrier medium, in particular a guiding or transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

For communication in the shared spectrum the communication network 1 according to the embodiment of the present invention supports at least two different ways of resource allocation for uplink (UL) transmission. The first way may involve dynamic allocation for allocating a scheduled uplink grant, while the second way may involve configured allocation. The configured allocation may also be called configured scheduling or configured uplink grant.

The dynamic allocation may use transmission of a downlink control information (DCI) for scheduled uplink grant from the network node 100 to the user equipment 200. The downlink control information (DCI) may be transmitted on the PDCCH. The downlink control information (DCI) may carry information such as physical layer resource allocation, power control commands and/or HARQ information and the like. The uplink transmission using scheduled uplink grant may be transmitted, for example, on the PUSCH and also be called scheduled PUSCH transmission or scheduled uplink transmission.

The configured allocation also called configured scheduling or configured uplink grant may comprise at least two different configured grant types: first configured uplink grant also called configured uplink grant Type 1 and second configured uplink grant also called configured uplink grant Type 2.

The configured uplink grant Type 1 may be based on a Radio Resource Control, RRC, configuration. In particular, in the configured uplink grant Type 1 an uplink grant is provided by RRC signaling from the network node 100 to the user equipment 200 and stored as configured uplink grant in the user equipment 200. On the other hand, in the configured uplink grant Type 2 the uplink grant is provided from the network node 100 to the user equipment 200 via PDCCH and in addition layer 1, L1, signaling is introduced for indicating configured uplink grant scheduling activation or scheduling release. Indicating configured uplink grant scheduling activation or scheduling release via L1 signaling may involve sending L1 activation or release message. More specifically indicating configured uplink grant scheduling activation or scheduling release via L1 signaling may involve sending a downlink control information (DCI) for scheduling activation or scheduling release. The downlink control information (DCI) for scheduling activation or scheduling release may be sent on the PDCCH.

Configured uplink grant Type 1 may be advantageous in respect to configured uplink grant Type 2 since the user equipment does not have to wait for the L1 activation message.

In the following, the uplink transmission of the User equipment 200 to the network node 100 using the configured uplink grant Type 1 or the configured uplink grant Type 2 will be called configured uplink transmission or configured uplink grant transmission. The configured uplink transmission may be transmitted, for example, on the PUSCH and also be called configured uplink grant PUSCH transmission.

According to the embodiment of the present invention, downlink feedback information (DFI) transmission is used to indicate the reception result at the network node 100 of the configured uplink transmission or scheduled uplink transmission from the user equipment 200 to the network node 100 in the shared spectrum. According to the embodiment of the present invention the method for downlink feedback information (DFI) transmission in the shared spectrum comprises: transmitting by the network node 100 to the user equipment 200 at least one downlink control information, said downlink control information carrying a downlink feedback information (DFI). The downlink feedback information (DFI) comprises a Hybrid Automatic Repeat Request Acknowledgement, HARQ-ACK, feedback information for the transmission from the user equipment 200 to the network node 100. In the above, downlink control information (DCI) carrying a downlink feedback information (DFI) is to be understood as downlink control information (DCI) comprising a downlink feedback information (DFI).

The transmission from the user equipment 200 to the network node 100 may comprise a PUSCH transmission and the PUSCH transmission may comprise a configured uplink grant PUSCH transmission or a scheduled PUSCH transmission.

This is described in more details further below for configured uplink transmission both for the case when the network node 100 receives the configured uplink grant transmission from the user equipment 200 and the case when the network node 200 does not receive the configured uplink grant transmission from the user equipment 200.

Figure 4:
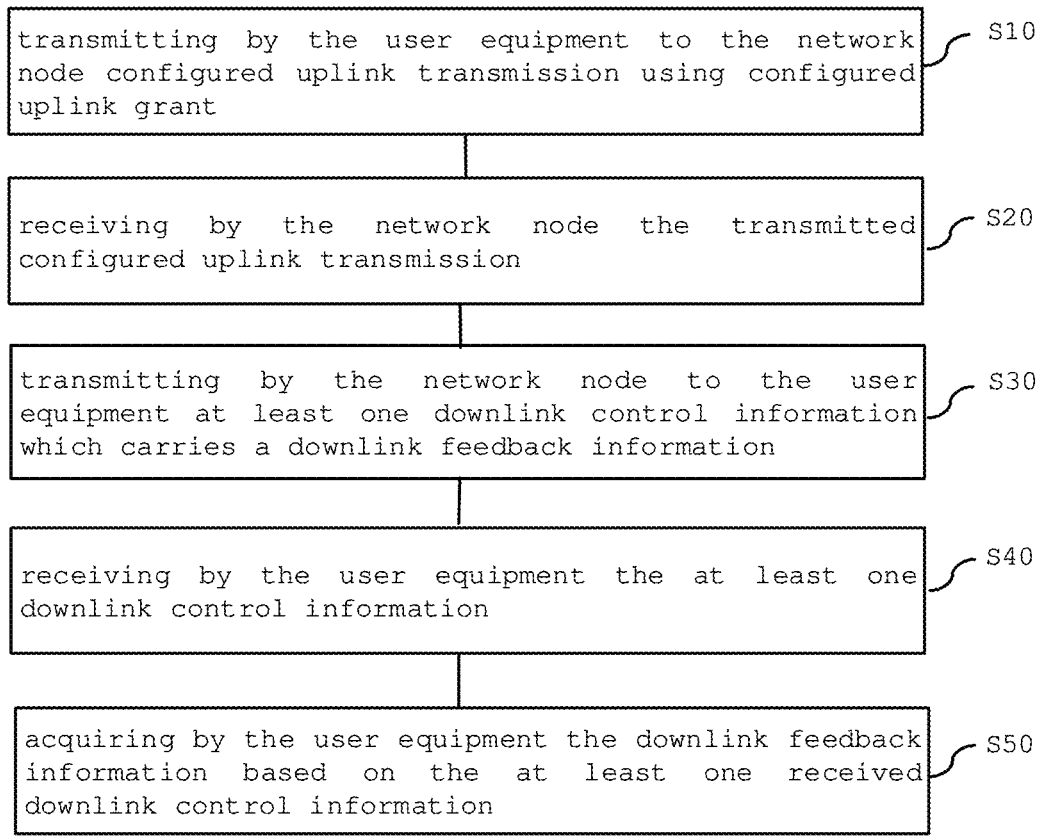
FIG. 4 shows schematically the communication between the network node and the user equipment according to the embodiment of the present invention.

FIG. 4 shows illustratively the communication between the user equipment 200 and the network node 100 according to the embodiment of the present invention for the case when the network node 100 receives the configured uplink transmission from the user equipment 200.

In step S10 the user equipment 200 transmits configured uplink transmission to the network node 100 using configured uplink grant. As elaborated above the user equipment 200 transmits the configured uplink transmission on the PUSCH. The configured uplink grant may be the configured uplink grant Type 1 or the configured uplink grant Type 2. The transmitted uplink grant transmission may comprise any kind of uplink (UL) data and/or uplink (UL) information.

In step S20 the network node 100 receives the configured uplink transmission from the user equipment 200.

In step S30 the network node 100 transmits to the user equipment 100 at least one downlink control information (DCI) which carries (or comprises) downlink feedback information (DFI). The downlink feedback information (DFI) is a downlink feedback information (DFI) for the received configured uplink transmission from the user equipment 200. The downlink feedback information (DFI) comprises a HARQ-ACK feedback information for the received configured uplink transmission from the user equipment 200. The network node 100 may transmit the at least one downlink control information (DCI) which carries downlink feedback information (DFI) on the PDCCH. The network node 100 may transmit the at least one downlink control information (DCI) which carries downlink feedback information (DFI) in at least one downlink control information (DCI) message on the PDCCH.

In step S40 the user equipment 200 receives the said at least one downlink control information (DCI) which carries downlink feedback information (DFI).

In step S50 the user equipment 200 acquires the downlink feedback information (DFI) based on the said at least one received downlink control information (DCI).

In the above, it has been described that in step S20 the network node 100 receives the configured uplink transmission from the user equipment 200. However, as elaborated above, according to the embodiment of the present invention, it is equally possible that in step S20 the network node 100 does not receive the configured uplink transmission from the user equipment 200. In this case, the downlink feedback information (DFI) of step S30 is a downlink feedback information indicating that the network node 100 has not received the configured uplink transmission from the user equipment 200. In this case, the downlink feedback information (DFI) comprises a HARQ-ACK feedback information indicating that the network node 100 has not received the configured uplink transmission from the user equipment 200.

As elaborated above the user equipment 200 transmits configured uplink transmission to the network node 100 using configured uplink grant which may be configured uplink grant Type 1 or configured uplink grant Type 2.

In the following it is assumed that when the configured uplink grant is configured uplink grant Type 1 the maximum length of the downlink feedback information (DFI) in the downlink control information (DCI) which carries downlink feedback information (DFI) is a first length (L1) and when the configured uplink grant is configured uplink grant Type 2 the maximum length of the downlink feedback information (DFI) in the downlink control information (DCI) which carries downlink feedback information (DFI) is a second length (L2). Here, the first length (L1) and the second length (L2) is to be understood as the number of bits of the downlink feedback information (DFI) in the downlink control information (DCI).

The first length, (L1) may be equal to the second length (L2).

When the first length, (L1) is equal to the second length (L2) the design of the downlink feedback information (DFI) transmission is such that the length of the downlink control information (DCI) for downlink feedback information (DFI) transmission for configured uplink grant Type 1 is the same as the length of downlink control information (DCI) for downlink feedback information (DFI) transmission for configured uplink grant Type 2. In addition, or as an alternative, the downlink control information (DCI) content for downlink feedback information (DFI) transmission for configured uplink grant Type 1 is the same as the downlink control information (DCI) content for downlink feedback information (DFI) transmission for configured uplink grant type 2.

Further, the first length (L1) may not be equal to the second length (L2).

When the first length (L1) is not equal to the second length (L2) the design of the downlink feedback information (DFI) transmission is such that the downlink control information (DCI) carries more downlink feedback information (DFI) bits for configured uplink grant Type 1 than that for configured uplink grant Type 2.

Optionally, the length of the downlink control information (DCI) for downlink feedback information (DFI) transmission for configured uplink grant Type 1 is larger than the length of the downlink control information (DCI) for downlink feedback information (DFI) transmission for configured uplink grant Type 2. This is mainly because some fields in the downlink control information (DCI) may be used as scheduling activation or scheduling release indication for configured uplink grant Type 2. Hence, those fields cannot be used for downlink feedback information (DFI) transmission.

Optionally, when the configured uplink grant is configured uplink grant Type 1 at least one of the following is supported:
i) The Configured Scheduling Radio Network Temporary Identifier (CS-RNTI) is Radio Resource Control (RRC) configured. For example, the network node 100 can configure the user equipment 200 with CS-RNTI via RRC configuration. The CS-RNTI is a unique user equipment identification. The CS-RNTI may be used for re-transmission of configured uplink grant transmission.
ii) The downlink control information (DCI) for downlink feedback information (DFI) transmission is addressed to CS-RNTI. This may involve scrambling the downlink control information (DCI) for downlink feedback information (DFI) to the CS-RNTI.
iii) The length of the downlink control information (DCI) for downlink feedback information (DFI) transmission is the same as the length of a downlink control information (DCI) for scheduled uplink grant. The length of downlink control information (DCI) for scheduled uplink grant may be a third length (L3).
iv) Since the actual uplink grant (the configured uplink grant) is configured via RRC, all the content in the downlink control information (DCI) can be used for downlink feedback information (DFI) transmission. Therefore, for example the first length can be equal to the third length (L1=L3).

Optionally, when the configured uplink grant is configured uplink grant Type 2 at least one of the following is supported:
i) The Configured Scheduling Radio Network Temporary Identifier (CS-RNTI) is RRC configured. The CS-RNTI may be used for re-transmission of configured uplink grant transmission but also for scheduling activation or scheduling release (scheduling activation/scheduling release) of the configured uplink grant. The network node 100 may transmit a downlink control information (DCI) for scheduling activation or scheduling release to the user equipment 200 to indicate a scheduling activation or scheduling release of the configured uplink grant.
ii) The downlink control information (DCI) for downlink feedback information (DFI) transmission and the downlink control information (DCI) for scheduling activation or scheduling release (scheduling activation/scheduling release) of the configured uplink grant are addressed to CS-RNTI. This may involve scrambling the downlink control information (DCI) for downlink feedback information (DFI) transmission to the CS-RNTI and scrambling the downlink control information (DCI) for scheduling activation or scheduling release to the CS-RNTI.
iii) The length of the downlink control information (DCI) for downlink feedback information (DFI) transmission and the length of the downlink control information (DCI) for scheduling activation or scheduling release of the configured uplink grant are the same as the length of the downlink control information (DCI) for scheduled uplink grant (the third length L3). Alternatively, or in addition, the length of a downlink control information (DCI) for scheduled downlink grant is also equal to the third length (L3).
iv) Since the actual uplink grant (configured uplink grant) is provided via the PDCCH, some fields in the downlink control information (DCI) may be used as scheduling activation/scheduling release indication, the content in the downlink control information (DCI) can be partially used for downlink feedback (DFI) transmission. Therefore, the second length is smaller than the third length (L2<L3).

The downlink control information (DCI) for scheduling activation or scheduling release may have several different formats each of which has different set of information it carries. The different formats may be the formats 0_0, 0_1, 1_0 and 1_1.

The format of the downlink control information (DCI) for downlink feedback information (DFI) transmission may be the same as the format of the downlink control information (DFI) for scheduling activation or scheduling release of the configured uplink grant.

Table 1 and Table 2 list at least some of the fields in the downlink control information (DCI) formats 0_0, 0_1, 1_0 and 1_1 in the downlink control information (DCI) for scheduling activation for configured uplink grant Type 2 and at least some of the fields in the downlink control information (DCI) formats 0_0 and 1_0 in the downlink control information (DCI) for scheduling release for configured uplink grant Type 2. The listed fields in Table 1 and table 2 will be called here below special fields.

At least the special fields listed in Table 1 and Table 2 which as elaborated above are used for scheduling activation or scheduling release of the configured uplink grant Type 2 cannot be used for downlink feedback information (DFI) transmission.

The special fields include partial or all of the following: HARQ process number and Redundancy version in the downlink control information (DCI) for scheduling activation for configured uplink grant Type 2.

Further, the special fields include partial or all of the following: HARQ process number, Redundancy version, Modulation and coding scheme and Frequency domain resource assignment in the downlink control information (DCI) for scheduling release for configured uplink grant Type 2.

TABLE 1

Special fields for UL grant Type 2 scheduling activation PDCCH validation

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 2

Special fields for UL grant Type 2 scheduling release PDCCH validation

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

The user equipment 200 can differentiate the downlink control information (DCI) for downlink feedback information (DFI) transmission and the downlink control information (DCI) for scheduling activation or scheduling release (scheduling activation/scheduling release) for the configured uplink grant which is the configured uplink grant Type 2 by at least one of the following alternatives:

i) First Alternative:

The user equipment 200 differentiates the downlink control information (DCI) for downlink feedback information (DFI) transmission and the downlink control information (DCI) for scheduling activation or scheduling release according to explicit indication information. The explicit indication information may comprise at least one first indicator.

In the following several examples of the at least one first indicator will be elaborated.

Example 1

In this example the downlink control information (DCI) includes the first indicator and the first indicator indicates whether the downlink control information (DCI) is used for downlink feedback information (DFI) transmission or for downlink control information (DCI) for scheduling activation or scheduling release. The first indicator may be the value of a bit of a predetermined bit field in the downlink control information (DCI). For example, when the value of this bit field is set to 0, this indicates downlink control information (DCI) format for downlink feedback information (DFI) transmission, and when the value of this bit field is set to 1, this indicates downlink control information (DCI) format for scheduling activation or scheduling release.

Example 2

In this example, the field "Identifier for DCI formats" in the downlink feedback information (DCI) formats 0_0, 0_1, 1_0 and 1_0 is reused to indicate whether the downlink control information (DCI) is used for downlink feedback information (DFI) transmission or for downlink control information (DCI) for scheduling activation or scheduling release. For example, the value of this "Identifier for DCI formats" field set to 0, indicates a downlink feedback information (DCI) format for downlink feedback (DFI) transmission while the value of this "Identifier for DCI formats" field set to 1, indicates a downlink control information (DCI) format for scheduling activation or scheduling release.

Example 3

In this example, the first indicator can be using a special combination of at least one of the following fields in the downlink control information (DCI) formats 0_0, 0_1, 1_0 and 1_0: Identifier for DCI formats, new data indicator, HARQ process number, Redundancy version, Modulation and coding scheme, Frequency domain resource assignment, Time domain resource assignment, UL/SUL indicator, Carrier indicator, Bandwidth part indicator, Frequency hopping flag, UL DAI (downlink assignment index), SRS resource indicator, Precoding information and number of layers, Antenna ports, SRS request, CSI request, CBG transmission information (CBGTI), PTRS-DMRS association, beta-offset indicator, DMRS sequence initialization, UL-SCH indicator.

For example, combination of "Identifier for DCI formats" and "Frequency hopping flag" is interpreted as the first indicator. If "Identifier for DCI formats" and "Frequency hopping flag" are all set to "0", this means the downlink control information (DCI) is used for downlink feedback information (DFI) transmission. If "Identifier for DCI formats" and "Frequency hopping flag" are all set to "1", this means that the downlink control information (DCI) is used for scheduling activation or scheduling release.

ii) Second Alternative

In this alternative the user equipment 200 differentiates the downlink control information (DCI) for downlink feedback information (DFI) transmission and the downlink control information (DCI) for scheduling activation or scheduling release according to implicit indication information.

The following options may be available.

Option 1:

The user equipment 200 differentiates the downlink control information (DCI) for downlink feedback information (DFI) transmission and the downlink control information (DCI) for scheduling activation/release according to a CORESET.

The CORESET is a set of physical resources (i.e, a specific area on NR Downlink resource grid) and a set of parameters that is used to carry PDCCH/DCI (PDCCH/Downlink Control Information). In NR the resource grid is characterized by one subframe in time domain and full carrier bandwidth in the frequency domain.

In this option, for example, the downlink control information (DCI) for downlink feedback information (DFI) transmission is configured to be transmitted in a first CORESET, and the downlink control information (DCI) for scheduling activation/release is configured to be transmitted in a second CORESET. For example, the network node 100 transmits the downlink control information (DCI) for downlink feedback information (DFI) transmission in a first CORESET and transmits the downlink control information (DCI) for scheduling activation/release in a second CORESET.

If the user equipment 200 receives one downlink control information (DCI) in the first CORESET, then the user equipment 200 can determine that the received downlink control information (DCI) is the downlink control information (DCI) for downlink feedback information (DFI) transmission. If user equipment 200 receives one downlink control information (DCI) in the second CORESET, then the user equipment 200 can determine that the received downlink control information (DCI) is the downlink control information (DCI) for scheduling activation/release.

Option-2:

The downlink control information (DCI) for downlink feedback information (DFI) transmission and the downlink control information (DCI) for scheduling activation/release are differentiated according to search space.

The search space refers to the areas in the downlink resource grid where the PDCCH may be carried. The user equipment 200 performs blind decoding throughout the search space trying to find the PDCCH.

In this option, for example, the downlink control information (DCI) for downlink feedback information (DFI) transmission is configured to be transmitted in a first search space, and the downlink control information (DCI) for scheduling activation/release is configured to be transmitted in a second search space. For example, the network node 100 transmits the downlink control information (DCI) for downlink feedback information (DFI) transmission in a first search space and transmits the downlink control information (DCI) for scheduling activation/release in a second search space.

If the user equipment 200 receives one downlink control information (DCI) in the first search space, then the user equipment can determine that the received downlink control information (DCI) is the downlink control information (DCI) for downlink feedback information (DFI) transmission.

If user equipment 200 receives one downlink control information (DCI) in the second search space, then the user equipment can determine that the received downlink control information (DCI) is the downlink control information (DCI) for scheduling activation/release.

Option-3:

The downlink control information (DCI) for downlink feedback information (DFI) transmission and the downlink control information (DCI) for scheduling activation/release are differentiated according to a Radio Network Temporary Identifier (RNTI).

For example, the downlink control information (DCI) for downlink feedback information (DFI) transmission is supposed to be scrambled in a first RNTI (or the first downlink control information (DCI) is addressed to the first RNTI), and the downlink control information (DCI) for scheduling activation/release is supposed to be scrambled in a second RNTI (or the second downlink control information (DCI) is addressed to a second RNTI). For example, the network node scrambles the downlink control information (DCI) for downlink feedback information (DFI) transmission in a first RNTI (or the first downlink control information (DCI) is addressed to the first RNTI), and the network node scrambles the downlink control information (DCI) for scheduling activation/release in a second RNTI (or the second downlink control information (DCI) is addressed to the second RNTI).

If the user equipment 200 receives one downlink control information (DCI) based on the first RNTI, then the user equipment 200 can determine that the received downlink control information (DCI) is the downlink control information (DCI) for downlink feedback information (DFI) transmission. If the user equipment receives one downlink control information (DCI) based on the second RNTI, then the user equipment 200 can determine that the received downlink control information (DCI) is the downlink control information (DCI) for scheduling activation/release.

The network node 100 may beforehand notify the user equipment 100 of the first RNTI and the second RNTI.

In summary, a method for downlink feedback information (DFI) design in NR-U has been elaborated, which can be used under the configuration of configured uplink grant Type 1 or configured uplink grant Type 2. With the elaborated method, more HARQ-ACK information bits can be carried in one downlink control information (DCI) in configured uplink grant Type 1, and the same downlink control information (DCI) format can be used for downlink feedback information (DFI) transmission as well as for scheduling activation/scheduling release in configured uplink grant Type 2.

The described method can be adopted in the 5G NR unlicensed (5G NR-U) band communications. The invention proposes technical mechanisms.

Although detailed embodiments have been described, these only serve to provide a better understanding of the invention defined by the appended claims and are not be seen as limiting.

The invention claimed is:

1. A method for downlink feedback information transmission in a shared spectrum, the method comprising:
   transmitting by a network node to a user equipment at least one downlink control information, said downlink control information carrying a downlink feedback information,
   wherein the downlink feedback information comprises a Hybrid Automatic Repeat Request Acknowledgement, HARQ-ACK, feedback information for a transmission from the user equipment to the network node;
   wherein at least one first indicator included in the downlink control information is used to differentiate the downlink control information for downlink feedback information transmission and the downlink control information for scheduling activation or scheduling release for a configured uplink grant.

2. The method for downlink feedback information transmission according to claim 1, wherein the transmission comprises a PUSCH transmission and the PUSCH transmission comprises a configured uplink grant PUSCH transmission or a scheduled PUSCH transmission.

3. The method for downlink feedback information transmission according to claim 2 wherein
   when the configured uplink grant is configured uplink grant Type 1, a maximum length of the downlink feedback information in the downlink control information is a first length, L1, and
   when the configured uplink grant is configured uplink grant Type 2, the maximum length of the downlink feedback information in the downlink control information is a second length, L2,
   wherein
   the first length, L1, is equal to the second length L2.

4. The method for downlink feedback information transmission according to claim 3 wherein
   when the configured uplink grant is the configured uplink grant Type 2
   a length of the downlink control information for downlink feedback information transmission and a length of a downlink control information for scheduling activation or scheduling release of the configured uplink grant are the same as a length of the downlink control information for scheduled uplink grant,
   wherein the length of the downlink control information for scheduled uplink grant is a third length, L3, and/or a length of a downlink control information for scheduled downlink grant is equal to the third length, L3.

5. The method for downlink feedback information transmission according to claim 4, wherein the second length, L2 is smaller than the third length, L3.

6. The method for downlink feedback information transmission according to claim 4, wherein
   a format of the downlink control information for downlink feedback information transmission is the same as a format of the downlink control information for scheduling activation or scheduling release of the configured uplink grant,
   wherein the format includes the format 0_1.

7. The method for downlink feedback information transmission according to claim 6, wherein
at least part of the following fields in the format 0_1 of the downlink control information for scheduling activation of the configured uplink grant are not used for downlink feedback information transmission: HARQ process number and Redundancy version.

8. A network node, comprising:
a radio circuitry, configured to transmit to a user equipment at least one downlink control information, said downlink control information carrying a downlink feedback information,
wherein the downlink feedback information comprises a Hybrid Automatic Repeat Request Acknowledgement, HARQ-ACK, feedback information for a transmission from the user equipment to the network node;
wherein at least one first indicator included in the downlink control information is used to differentiate the downlink control information for downlink feedback information transmission and the downlink control information for scheduling activation or scheduling release for a configured uplink grant.

9. The network node according to claim 8, wherein the transmission comprises a PUSCH transmission and the PUSCH transmission comprises a configured uplink grant PUSCH transmission or a scheduled PUSCH transmission.

10. The network node according to claim 9 wherein
when the configured uplink grant is configured uplink grant Type 1, a maximum length of the downlink feedback information in the downlink control information is a first length, L1, and
when the configured uplink grant is configured uplink grant Type 2, the maximum length of the downlink feedback information in the downlink control information is a second length, L2,
wherein
the first length, L1, is equal to the second length L2.

11. The network node according to claim 10 wherein
when the configured uplink grant is the configured uplink grant Type 2
a length of the downlink control information for downlink feedback information transmission and a length of a downlink control information for scheduling activation or scheduling release of the configured uplink grant are the same as a length of the downlink control information for scheduled uplink grant,
wherein the length of the downlink control information for scheduled uplink grant is a third length, L3, and/or a length of a downlink control information for scheduled downlink grant is equal to the third length, L3.

12. The network node according to claim 11, wherein the second length, L2 is smaller than the third length, L3.

13. The network node according to claim 11, wherein
a format of the downlink control information for downlink feedback information transmission is the same as a format of the downlink control information for scheduling activation or scheduling release of the configured uplink grant,
wherein the format includes the format 0_1.

14. The network node according to claim 13, wherein
at least part of the following fields in the format 0_1 of the downlink control information for scheduling activation of the configured uplink grant are not used for downlink feedback information transmission: HARQ process number and Redundancy version.

15. A user equipment (UE), comprising:
a radio circuitry, configured to receive at least one downlink control information, said downlink control information carrying a downlink feedback information; and
a processor, configured to acquire the downlink feedback information, based on the at least one received downlink control information; wherein the downlink feedback information comprises a Hybrid Automatic Repeat Request Acknowledgement, HARQ-ACK, feedback information for a transmission from the user equipment to a network node;
the processor is further configured to differentiate the downlink control information for downlink feedback information transmission and the downlink control information for scheduling activation or scheduling release for a configured uplink grant based on at least one first indicator included in the downlink control information.

16. The UE according to claim 15, wherein the transmission comprises a PUSCH transmission and the PUSCH transmission comprises a configured uplink grant PUSCH transmission or a scheduled PUSCH transmission.

17. The UE according to claim 16 wherein
when the configured uplink grant is configured uplink grant Type 1, a maximum length of the downlink feedback information in the downlink control information is a first length, L1, and
when the configured uplink grant is configured uplink grant Type 2, the maximum length of the downlink feedback information in the downlink control information is a second length, L2,
wherein
the first length, L1, is equal to the second length L2.

18. The UE according to claim 17 wherein
when the configured uplink grant is the configured uplink grant Type 2
a length of the downlink control information for downlink feedback information transmission and a length of a downlink control information for scheduling activation or scheduling release of the configured uplink grant are the same as a length of the downlink control information for scheduled uplink grant,
wherein the length of the downlink control information for scheduled uplink grant is a third length, L3, and/or a length of a downlink control information for scheduled downlink grant is equal to the third length, L3.

19. The UE according to claim 15, wherein
the at least one first indicator is a bit value of a predetermined bit field in the downlink control information.

* * * * *